United States Patent [19]

Ross, Jr. et al.

[11] Patent Number: 4,770,345
[45] Date of Patent: Sep. 13, 1988

[54] IRRIGATION CONTROL VALVE SYSTEM

[76] Inventors: John R. Ross, Jr., 13020 Long Boat Way, Del Mar, Calif. 92014; Davorin D. Kapich, 3111 Serrano Dr., Carlsbad, Calif. 92008

[21] Appl. No.: 934,464
[22] Filed: Nov. 24, 1986
[51] Int. Cl.$^4$ ............................................. B05B 12/08
[52] U.S. Cl. ...................................... 239/65; 137/403
[58] Field of Search .................... 239/63, 65; 137/403, 137/404, 78.1, 78.2

[56] References Cited

U.S. PATENT DOCUMENTS

| | | | |
|---|---|---|---|
| 1,822,901 | 9/1931 | De Lacy-Mulhall | 239/65 X |
| 2,577,337 | 12/1951 | Lancaster | 239/65 |
| 2,895,493 | 7/1959 | Edwards | 239/65 X |
| 3,036,780 | 5/1962 | Nelson | 239/65 |
| 3,465,771 | 9/1969 | Tishler | 239/65 X |

Primary Examiner—Andres Kashnikow
Assistant Examiner—Kevin Patrick Weldon

[57] ABSTRACT

A very simple system to automatically control the flow of irrigation water. The stem of a water shutoff valve is controlled by a balance beam having two arms extending perpendicular to the axis of rotation of the valve stem. The angle between the two arms is about 135 degrees. At the end of the second arm is a water bucket. At the end of the first arm is a counter weight. When the first arm is horizontal, the water bucket is elevated and the valve is open. The water bucket collects a small portion of the irrigation water flow. When the bucket is substantially full, the second arm moves to a horizontal position, the counterweight is elevated and the valve is closed.

6 Claims, 4 Drawing Sheets

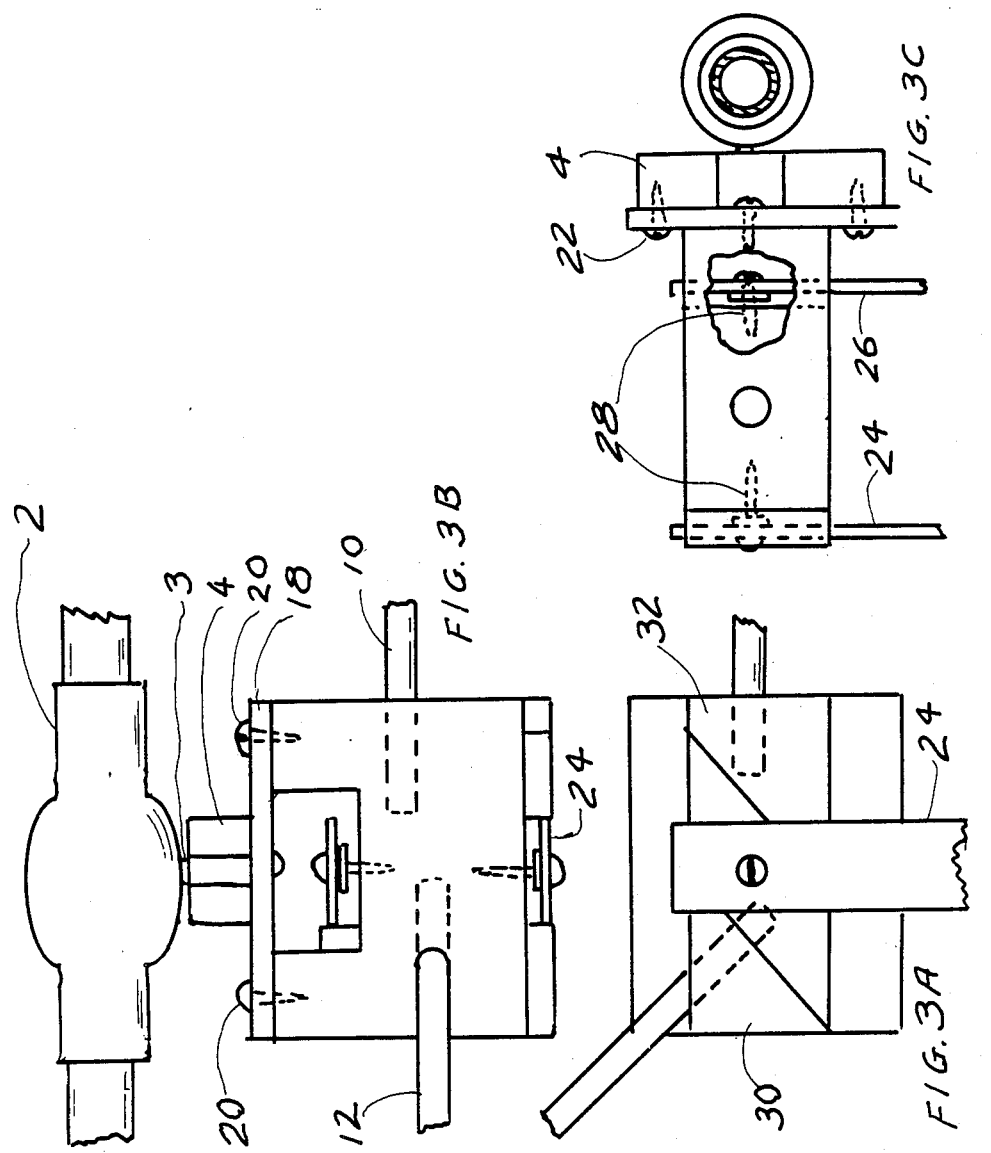

IRRIGATION CONTROL VALVE SYSTEM

This invention relates to irrigation control valves and in particular to automatic irrigation control valves.

BACKGROUND OF THE INVENTION

Various systems exists for controlling irrigation water flow. The most common are hand operated valves where an operator manually turns the water on when he wants to irrigate and off after sufficient irrigation. Valves are available which can be preset to close after a predetermined quantity of water has passed through. These valves are substantially more expensive than hand operated cutoff valves. Elaborate systems exist for detecting ground moisture and determining when irrigation should be started. Electrically controlled valves are available which will turn irrigation valves on and off on a predetermined schedule. Sometimes the irrigation is started in the middle of a rain storm, and these systems are expensive compared to the hand operated system.

What is needed is a completely automatic, cheep irrigation control valve system which will never turn the water on in the rain.

SUMMARY OF THE INVENTION

The present invention provides a very simple system to automatically control the flow of irrigation water. The system is extremely inexpensive to manufacture and install and can operate for months and possibly years without operator effort. The system comprises a water shutoff valve, a water collection means, and a control means for closing the shutoff valve when the collection means is filled to a first predetermined quantity and opening the shutoff valve when the quantity of water in the collection means drops to a second predetermined quantity. In a preferred embodiment of the present invention used to control a sprinkler system, the control means comprises a seesaw type ballance beam having approximately equal length arms and attached at its point of rotation to the stem of a ball type shutoff valve. At one end of the balance beam is the water collection means which is a bucket so located so as to collect a portion of the output of the sprinkler system. At the other end of the ballance beam is a counterweight weighing more than the collection means filled to the second quantity and less than the collection means filled to the first quantity.

BRIEF DESCRIPTION OF THE DRAWINGS

FIGS. 3A, 3B and 3C are respectively back, top and side views of a portion of the preferred embodiment shown in FIGS. 1 and 2.

FIG. 4 is a cross sectional view of a feature of a preferred embodiment of the present invention.

DESCRIPTION OF THE PREFERRED EMBODIMENT

A preferred embodiment of the present invention may be described by reference to the figures.

Figure 1:
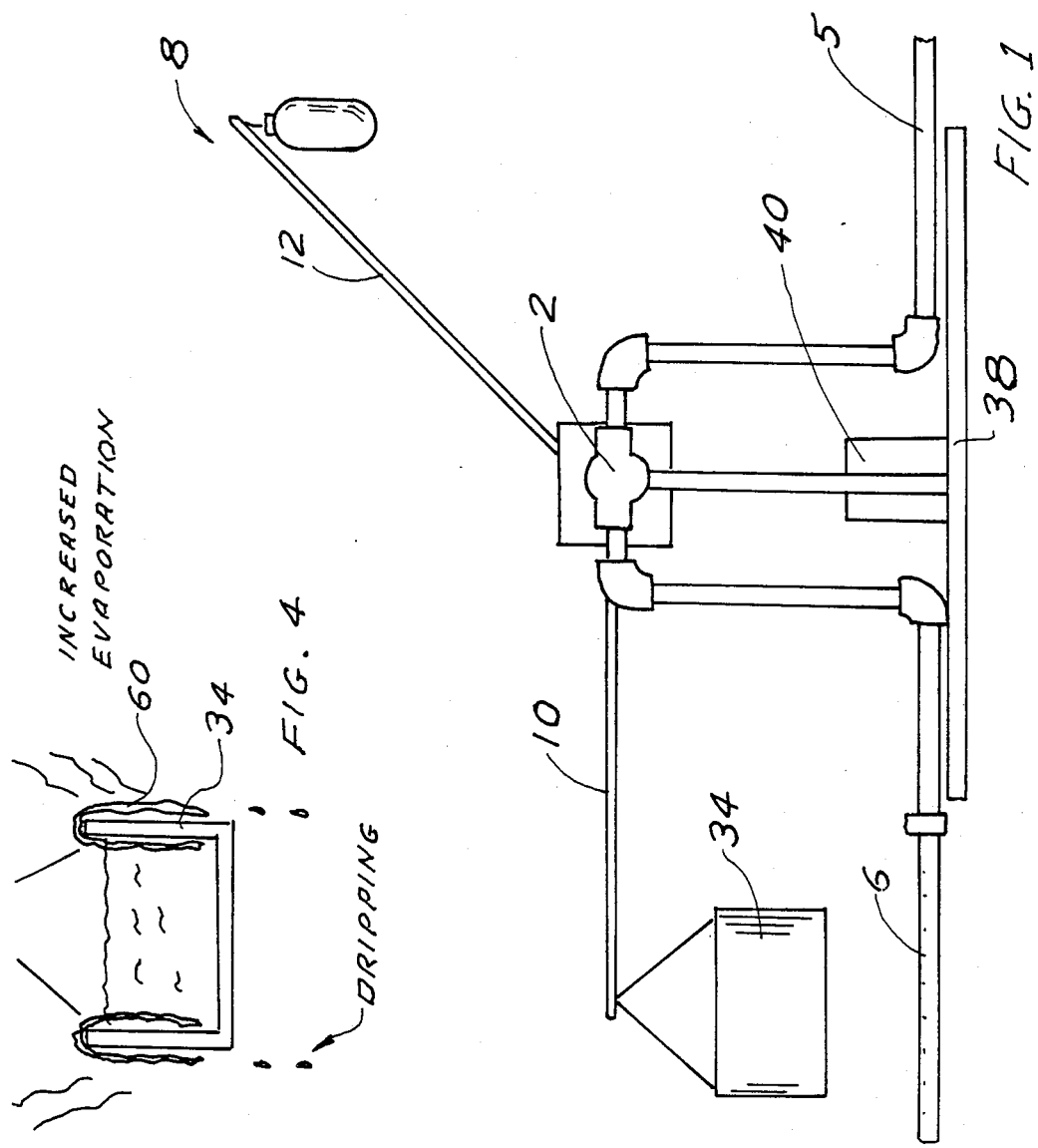
FIG. 1 is a drawing of a preferred embodiment of the present invention in a closed position.

A ½-inch ball type shutoff valve 2 having a stem 3 and a handle 4 is installed in an irrigation system which comprises water sourse 5 under pressure and irrigation pipes 6. A seesaw type ballance beam 8 having two arms 10 and 12 is connected to the valve stem 3 so that the axis of rotation of ballance beam 8 is the same as that of valve stem 3. In this preferred embodiment the connection is made utilizing wood block 16 into which arms 10 and 12 are inserted. Block 16 is connected to handle 4 utilizing connector 18 and screws 20 and 22. Block 16 is supported by support posts 24 and 26 and axil screws 28 so that block 16 and the rest of ballance beam 8 is allowed to rotate about axil screws 20 and 22. However, rotation is limited by stop plates 30 and 32. Arms 10 and 12 are each about 3 feet long. At the end of arm 10 is shallow light-weight (preferably plastic) water bucket 34 having a capacity of about one quart. At the end of arm 12 is counterweight 36 which is substantially heaver than bucket 34 when bucket 34 is empty but substantially lighter than bucket 34 full of water. In my preferred embodiment counterweight 36 is comprised of a 1-pint plastic jar partially full of water. Arm 10 is positioned in block 16 such that when valve 2 is closed arm 10 is at 180 degrees as shown in FIG. 1. Stop plates 30 and 32 prevent arm 10 from rotating lower than 180 degrees and arm 10 from rotating higher than 135 degrees (the full open position for this embodiment, FIG. 2). Simularily, arm 12 is positioned at the close position at 45 degrees and 0 degrees at the open position. In my preferred embodiment arms 10 and 12 are comprised of aluminum 5/16-inch rods. A string not shown stretched tightly between the ends of arms 10 and 12 adds support. Support posts 24 and 26 are ⅛-inch by ¾-inch steel plate. The support posts are mounted on wooden board 38 and braced by braces 40. Essentially all of the weight of valve 2 is supported by inlet pipe 38 and outlet pipe 40.

Figure 2:
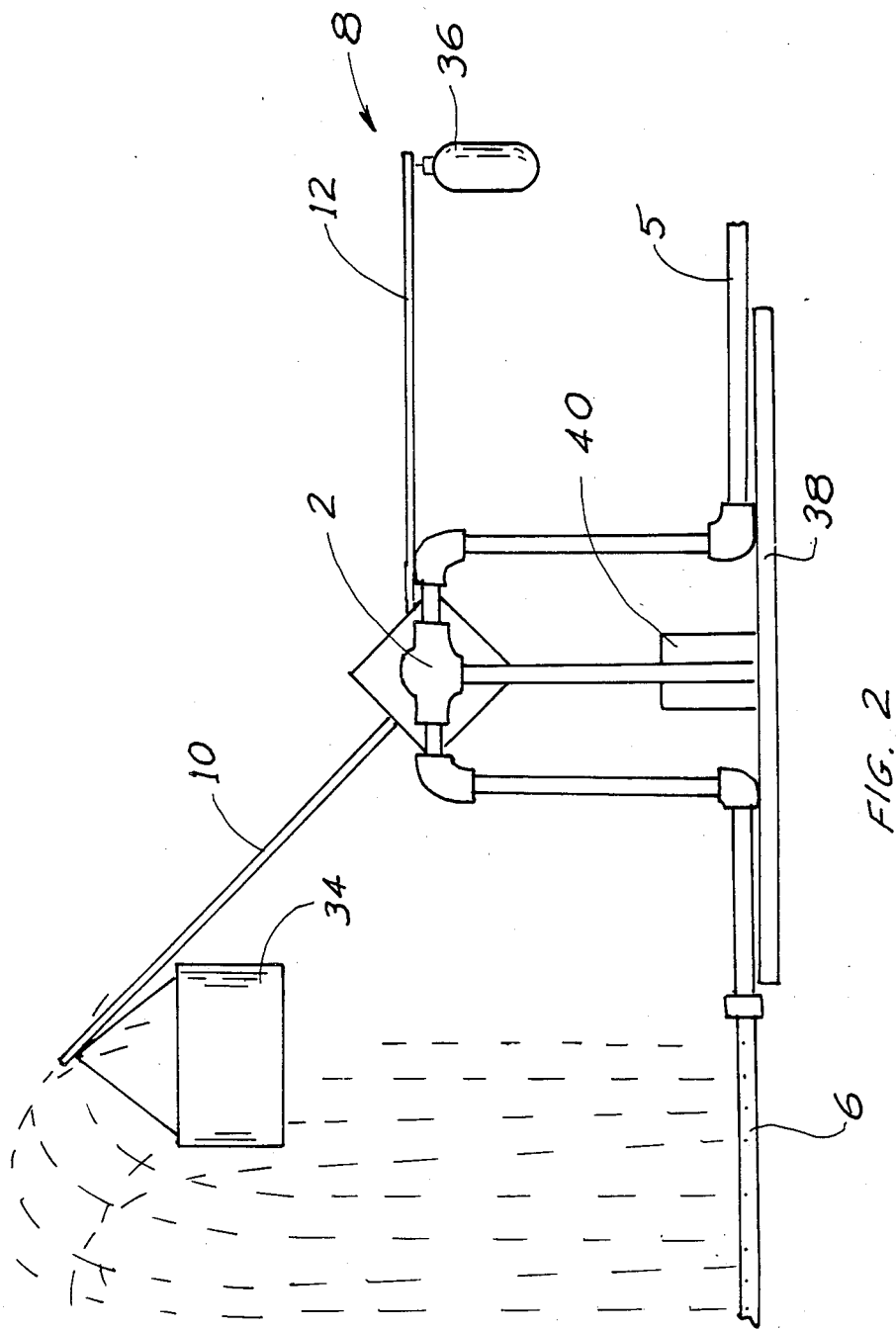
FIG. 2 is a drawing of the embodiment of FIG. 1 in an open position.

In this preferred embodiment when bucket 34 is essentially empty, ballance beam 8 is in the position shown in FIG. 2, valve 2 is open a heavy water spray 42 is emitted from irrigation pipe 6. A very small portion of water spray 42 is collected in water bucket 34 each minute valve 2 is open. When water bucket 34 is about ¾ths full <a predetermined first quantity>, the weight of bucket 34 will be sufficient to cause ballance beam 8 to begin to rotate counterclockwise. Once rotation has preceded by a small angle the counterclockwise torque will increase. This assures that ballance beam 8 will continue to rotate until it is in the position shown in FIG. 1, at which position valve 2 will be closed and the water spray will be shut off. Ballance beam 8 will remain in this position untill almost all of the water in bucket 34 has been removed <for example by evaporation> to a predetermined second quantity, at which time counterweight 36 will cause ballance beam 8 to begin to rotate clockwise. Again, once started, ballance beam 8 will continue to rotate until it is in the position shown in FIG. 2.

The irrigation time <with ballance beam 8 in the position shown in FIG. 1> can be increased or decreased by regulating the rate at which water is collected in bucket 34. For a longer irrigation time a bucket with a wider mouth could be used, or the irrigation spray in the direction of the mouth of the bucket could be decreased. Normally an irrigation time of about 1 to 3 hours is desired. The time between irrigations <with ballance beam 8 in the position shown in FIG. 2> can be increased or decreased by regulating the rate at which water is removed from bucket 34. In one embodiment of this invention the water is removed from bucket 34 simply by evaporation from the surface of the water. This method of removal will normally result in intervals between irrigations of many days depending on temperature, humidity, sunshine and surface area of the water in the bucket. In an expirament conducted during the Fall in Del Mar, Calif. with one of our prototypes with a water surface area of about 25 square inches, about 3 to 4 weeks are required to remove sufficient water from the bucket 34 to cause the ballance beam 8 to open valve 2. Evaporation rate can be increased utilizing one or more wicks. In a test we lined our bucket with a wick made of a silk rag as shown in FIG. 4. Approximately $\frac{3}{4}$ quart was removed in about 3 days, part by dripping off the ends of silk rag 60 and part by evaporation. An inherent advantage of relying on evaporation to remove the water is that hot dry weather conditions will reduce the time between irrigations which will generally be consistant with the need of the plants being irrigated.

Figure 5:
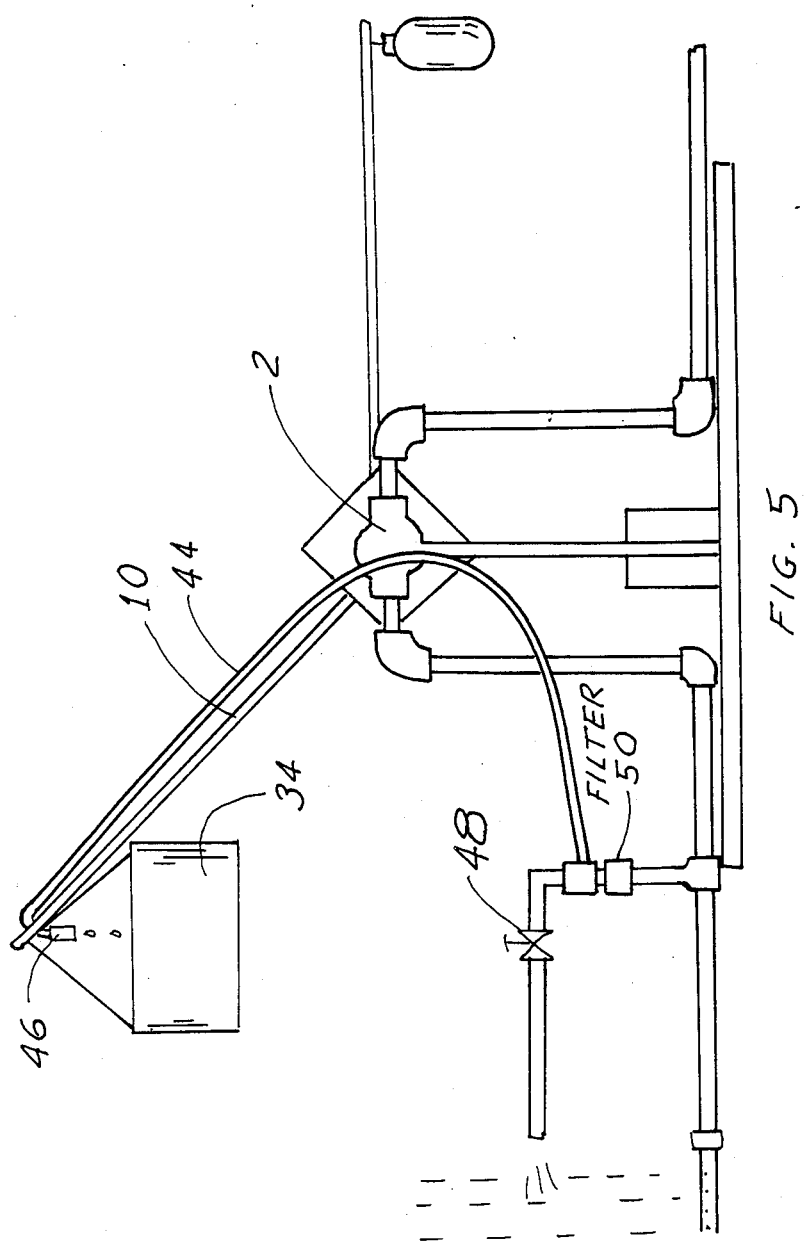
FIG. 5 is a drawing showing a feature of a preferred embodiment of the present invention.

Another preferred method of filling bucket 34 to said first predetermined level are shown in FIG. 5. Flexible tube 44 is run up arm 10 to drip control device 46 mounted at the end of arm 10 over bucket 34. The other end of flexible tube 44 is connected to the irrigation system water supply downstream of valve 2 and up stream of irrigation pipe 6. A small water diversion valve 48 can be installed to reduce the water pressure in tube 44 and thus the drip rate into bucket 34. A filter 50 can also be added as shown in FIG. 5 to avoid plugging of drip control device 46 and valve 48 and to also reduce the pressure in tube 44. A good drip control device to use in this application is a laminer flow drip emitter distributed by Olsen Irrigation. The drip emitter we used was rated at 1 gal/hr at 20 psi. However, we operated the emitter at about 1 psi and we got a drip rate in the range of about a quart in about 4 hours. Opening valve 48 reduces the pressure at drip emitter 46 and increases the irrigation time. Closing down on valve 46 conversely increases the drip rate and reduces the irrigation time. Another method of filling bucket 34 is to utilize very small inside diameter tubing for tube 44. With a small enough ID, valve 48 and/or control device 46 can be eliminated; however, the smaller the ID the greater the risk of plugging.

In our prototype models we used PCV ball valves for valve 2 because they were cheaper and easier to open and close than metal valves; however, many other types of valves could be used.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

We claim:

1. An irrigation control valve system for controlling the flow or irrigation water comprising:
    a water shutoff valve having a valve stem, said valve stem having an axis of rotation,
    a seesaw type ballance beam connected to said valve stem and having a first arm and a second arm and an axis of rotation which is the same as the axis of rotation of said valve stem,
    a water collection means for collecting a portion of said irrigation water flow attached near the end of said second arm,
    a counterweight attached near the end of said first arm,
    a fill means for directing a portion of said irrigation water to said collection means
said first and second arms extending essentially perpendicular to said axes of rotation in directions such as to define an angle between them substantially greater than 90 degrees and substantially less than 180 degrees, and said arms and valve being positioned such that:
    said second arm and said water collection means are in a maximum raised position, with said water collection means collecting water, when said water shutoff valve is in its fully open position and positioned such that any downward rotation of said second arm will provide an ever increasing closing torque to said water shutoff valve stem until said second arm is substantially horizontal and said water shutoff valve is closed, and
    said first arm and said counterweight are in a maximum raised position when said water shutoff valve is closed and positioned such that any downward rotation of said first arm will provide an ever increasing opening torque to said water shutoff valve stem until said first arm is substantialy horizontal and said shutoff valve is in its fully open position.

2. A system in accordance with claim 1 wherein said angle between said first and second arm is approximately 135 degrees.

3. A system in accordance with claim 1 further comprising a sto means to prevent said first arm and said second arm from rotating significantly below their horizontal position.

4. A system in accordance with claim 1 wherein said fill means is a sprinkler system having a plurality of sprinkler outlets in which one or more of said sprinkler outlets are directed so as to sprinkle water into said water collection means.

5. A system in accordance with claim 1 wherein said fill means is a drip system comprisng a drip line, a laminer flow drip emitter and a means of regulating the water pressure in said drip line and laminer flow drip emitter.

6. A system in accordance with claim 1 and further comprising a means of decreasing the quantity of water in said collection means.

* * * * *